Figure 1:
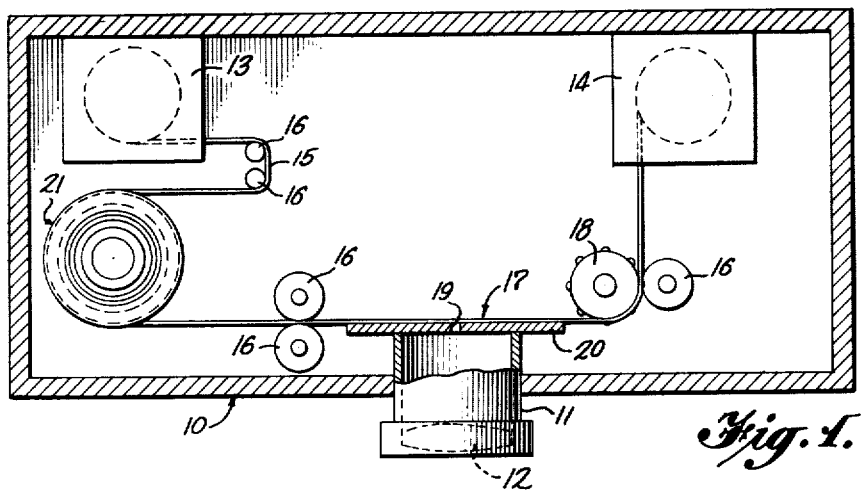

March 19, 1963    G. D. LAIRD    3,082,424
FILM IDENTIFICATION UNIT FOR RACE CAMERAS
Filed Aug. 29, 1961    2 Sheets-Sheet 1

INVENTOR
Glenn D. Laird

BY Mason, Fenwick & Lawrence
ATTORNEYS

March 19, 1963 G. D. LAIRD 3,082,424
FILM IDENTIFICATION UNIT FOR RACE CAMERAS
Filed Aug. 29, 1961 2 Sheets-Sheet 2
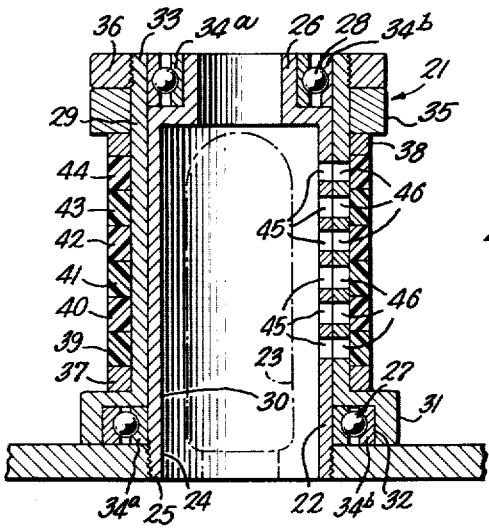
Fig. 4.
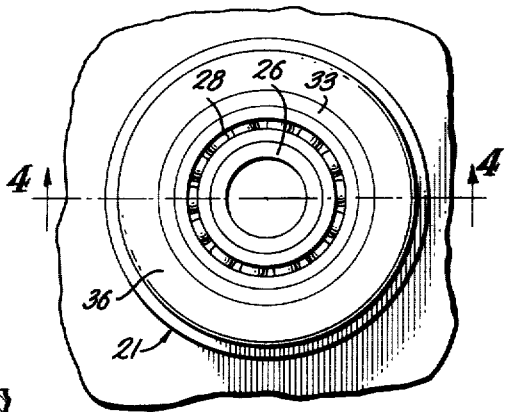
Fig. 5.
Fig. 7.
| 39— | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 40— | | | | | RACE | | | | | | | | | | |
| 41— | FORT MIAMI | | CHARLESTOWN | | TIMONIUM | | OAKLAWN | | | BELAIR | | | SHENANDOAH | | |
| 42— | JAN | FEB | MAR | APR | MAY | JUNE | | JUL | AUG | SEP | | OCT | NOV | DEC | |
| 43— | 1 | 2 | 3 | 4 | 5 | 6 | 7 | 8 | 9 | 10 | 11 | 12 | 13 | 14 15 16 17 18 19 20 21 22 23 24 25 26 27 28 29 30 31 | | |
| 44— | 1961 | 1962 | 1963 | 1964 | 1965 | 1966 | 1967 | 1968 | 1969 | 1970 | 1971 | 1972 | 1973 | 1974 1975 1976 1977 1978 | | |
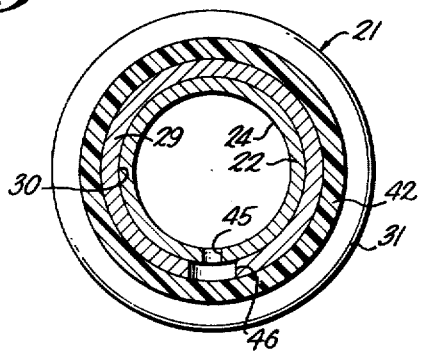
Fig. 6.
INVENTOR
Glenn D. Laird
BY Mason, Fenwick & Lawrence
ATTORNEYS

United States Patent Office

3,082,424
Patented Mar. 19, 1963

3,082,424
FILM IDENTIFICATION UNIT FOR RACE CAMERAS
Glenn D. Laird, P.O. Box 5814, Baltimore 8, Md.
Filed Aug. 29, 1961, Ser. No. 134,708
6 Claims. (Cl. 346—107)

The present invention relates in general to continuous flow, strip film cameras for recording the relative positions of contestants as they cross the finish line of a race course, generally known as photofinish cameras, and more particularly to the provision of such photofinish cameras with novel indicia bearing driven means for selectively printing or recording on photographic film by contact printing exposure desired data while the film is being advanced through the camera to record the finish of the race.

As a measure to select the winner of a race which has been run too close for the human eye to select the first to cross the finish line by direct visual inspection, and to forestall complaints and litigation regarding judgments as to the winner of a race by providing a permanent record of the sequence in which the contestants cross the finish line, it has become a common practice, particularly in connection with horse racing, to photographically record the finish of each race. The type of camera most frequently used to so record the finish of races is the continuous flow, strip film camera, wherein the film is advanced past a narrow slit interposed between the camera objective and the film at a film speed correlated to the average speed of the contestants crossing the finish line, to produce a photographic negative wherein the images of the contestants are longitudinally spaced along the film in a definite, determinable relationship to the times at which the contestants cross the finish line. By the use of techniques described, for example, in Jones Patent No. 2,482,621 or Kuprion Patent No. 2,785,945, an artificially created finish line may then be constructed on the photographic record in the process of preparing a positive print, which is precisely oriented in relation to the actual finish line and is disposed in touching relation to the leading part of the leading contestant to determine the contestant who first crosses the finish line and provide a base for measurement of the relative times at which the other contestants cross the finish line. To resist surreptitious alteration of such photographic records and avoid future question as to the particular contest depicted by the record, it has also been recognized as desirable to photographically record on the film an identification of the race course, the date, and the number of the race, and such other identifying information or reference marks as may be desired.

U.S. Patent No. 2,482,621 to Jones illustrates an example of such a data recording arrangement wherein this information together with the photographic images of timing lines are recorded on the film during the recording of the finish by projecting through lenses images of an indicia bearing drum driven independently of the film onto the film photosensitive surface. The indicia on the drum described in the Jones patent is imprinted on strips of paper which are cemented to the surface of the drum, and movable number bearing wheels or disks are supported in the drum for selective angular adjustment to permit change of the indicia indicating the number of the race. This construction, therefore, requires the use of lenses for projecting onto the film an enlarged or reduced image of the indicia bearing drum, together with an independent driving motor for rotating the drum at some speed designed to be proportional to the linear travel of the film during production of the race images, and requires the removal of the cemented paper strips and substitution of new paper strips when it is desired to change indicia other than the race number.

An object of the present invention is the provision of a continuous flow, strip film camera for recording the finish of a race, having novel indicia bearing driven means for recording race identifying data, timing reference marks and the desired indicia on the photographic film in preselected relation to the photographic image of the race finish.

Another object of the present invention is the provision of a camera of the character described in the preceding paragraph, wherein the indicia bearing driven means is disposed in direct contact with the film for printing the data on the film by contact printing and which is driven by frictional engagement with the film to secure coordination of movement of the film and indicia.

Another object of the present invention is the provision of a camera of the character described in the preceding paragraph, wherein the rapid data carried by movable elements of the indicia bearing driven means may be quickly and readily changed to alter the displaced data.

Other objects, advantages and capabilities of the present invention will become apparent from the following detailed description, taken in conjunction with the accompanying drawings illustrating a preferred embodiment of the invention.

Figure 2:
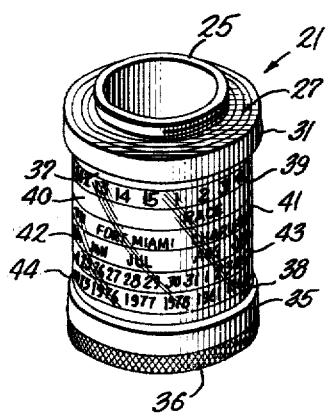
Figure 3:
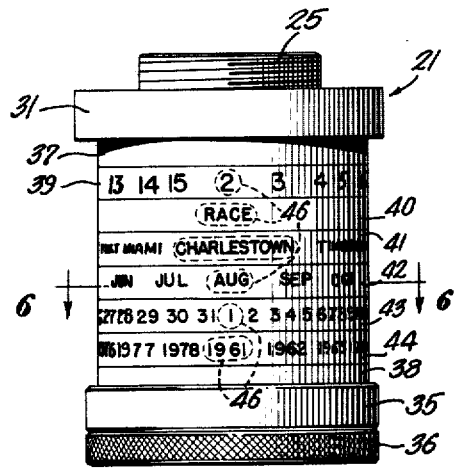

Referring to the drawings:
FIGURE 1 is a schematic cross-sectional view of a continuous flow, strip film camera embodying the present invention;
FIGURE 2 is a perspective view of the indicia bearing film marking unit of the present invention in inverted position;
FIGURE 3 is an elevation view of the indicia marking unit in inverted position;
FIGURE 4 is a vertical section view of the marking unit, taken along the line 4—4 of FIGURE 5;
FIGURE 5 is a top plan view of the marking unit;
FIGURE 6 is a horizontal section view of the marking unit, taken along the line 6—6 of FIGURE 3; and
FIGURE 7 is a developed view of the peripheries of the indicia bearing rings of the marking unit.

Referring to the drawing, wherein like reference characters represent corresponding parts throughout the several figures, the photographic camera, which is preferably of the continuous flow, strip film type, is designated generally by the reference character 10 and is provided with the usual lens barrel 11 having the objective lens 12 therein, a film supply magazine 13 and a film take-up magazine 14 each constructed in a conventional manner to prevent passage of light from the outside of the magazine to the interior and adapted to receive a rotatable film spool containing a continuous strip of film 15. The film 15 is guided in its path through the camera by the usual idler rollers 16 and is advanced through a focal plane 17 disposed behind the lens 12 by the usual driving sprocket or roller 18 driven by a source of motive power such as a constant speed electric motor (not shown) so as to continuously drive the film through the focal plane 17 at a predetermined speed. An exposure slit 19 is provided in an aperture member 20 disposed immediately adjacent the focal plane 17 between the film 15 and objective lens 12, and the camera is arranged relative to the finish line of the race course so that this rectilinear exposure aperture 19, which extends transversely of the film, is arranged in a vertical plane with the finish wire so that the field of view of the camera is limited to the finish wire of the race course and a narrow band across the track on either side of the finish wire. When the speed of the driving sprocket 18 is adjusted so that the movement of the film 15 across the exposure slit 19 is properly correlated to the average speed of movement of the contestants across the finish line of the race course so as to stop relative motion between the race contestants and the images of these contestants focused on the film 15 at the focal plane of the camera, the photosensitive emulsion of the film will record an image of the finish of the race in a known manner wherein the recorded images of the race contestants are spaced longitudinally along the film in determinable relation to their times of crossing the finish line.

As shown in FIGURE 1, the film 15 in its travel from the supply magazine 13 to the focal plane 17 is trained about an indicia bearing marking unit indicated generally by the reference character 21, shown more clearly in FIGURES 2 to 6. This film marking unit 21 takes the form of an internally illuminated rotatable cylinder having interchangeable peripheral indicia-bearing elements disposed in direct contact with the film 15 as the film advances from the film supply magazine 13 to the focal plane 17 to be driven by frictional engagement with the film so that no relative movement occurs between them and produce a contact printed record of the indicia on the film. In the preferred embodiment of the film marking unit 21 herein illustrated, the marking unit 21 comprises a stationary hollow cylindrical hub member 22 forming a housing for a lamp or other convenient light source 23 which extends axially along the bore 24 of the hub member 22 and is seated in a suitable socket (not shown) mounted in the camera. The hub member 22 has an externally threaded lower end 25 adapted to be threaded into a suitable mounting boss or the like on the camera housing and a constricted upper end portion 26 through which the bore 24 opens to permit escape of heat from the bore 24. A pair of ball bearing assemblies 27, 28 are provided on the hub member 22 adjacent the threaded lower end 25 and the constricted upper end 26 to support an apertured shield member 29 for rotation about the hub member 22. The shield member 29, which forms a shutter for the marking unit 21 and a rotatable carrier for the indicia, is of hollow cylindrical configuration over its major extent having a bore 30 whose inner diameter approximates the outer diameter of the hub member 22, and terminates at its lower end in an outwardly projecting stop flange 31 having an inwardly and downwardly opening annular recess 32. The ball bearing assembly 27 is disposed within the recess 32 in the stop flange 31 and the ball bearing assembly 28 is disposed between the externally threaded upper end portion 33 of the shield member 29 and the constricted portion 26 of the hub member 22, each ball bearing assembly including an inner race 34a fixed to the hub member 22 and an outer race 34b fixed to the shield member 29.

An annular upper stop ring 35 having an inner diameter slightly greater than the outer diameter of the shield member 29 is to be slipped over the threaded upper end 33 of the shield member 29 and held against withdrawal by an internally threaded knurled retainer nut 36 which is threaded onto the upper end 33 of the shield member 29. Annular fiber rings 37, 38 are slidably supported on the shield member 29 beside the mutually adjacent surfaces of the stop flange 31 and stop ring 35 to restrain between the fiber rings 37, 38 a plurality of indicia bearing rings 39, 40, 41, 42, 43 and 44 on the shield member 29. The indicia bearing rings 39–44 are of similar construction and configuration, and are preferably formed of a suitable transparent or translucent plastic material with opaque indicia on the outer peripheral surface of each ring. In the illustrated example, the rings 39–44, in ascending order, contain numerals for designating the number of the race, the word "RACE," a plurality of track names, the abreviations of the months of the year, numerals designating the days of the month, and numerals designating years for the anticipated period of use of the marking unit, all as illustrated in the developed view of the indicia bearing rings shown in FIGURE 7.

The cylindrical wall of the hub member 22 is provided with a series of circular light apertures 45 corresponding to the number of indicia bearing rings 39–44 to be used, arranged in substantial radial alignment with the centers of the rings 39–44 and preferably aligned along an axis paralleling the axis of the hub member 22. Similarly, the rotatable light shield member 29 is provided along the cylindrical portion thereof with a plurality of light slots 46 corresponding to and disposed in radial alignment with the apertures 45 of the hub member 22 and having sufficient length circumferentially of the shield member 29 to pass light through their associated overlying rings 39–44 over a zone corresponding to the width of the world or number to be recorded.

The film 15 is trained about the periphery of the marking unit 21, as illustrated in FIGURE 1, over a substantial portion of the circumference of the marking unit and in tight frictional contact with the peripheries of the indicia bearing rings 39–44 so as to rotate the rings 39–44 and shield member 29 as a unit about the stationary hub member 22 in accordance with the speed of advancement of the film 15 responsive to the drive sprocket 18. This provides a simple and sure expedient for insuring peripheral movement of the indicia on the rings 39–44 in precise correspondence with movement of the film 15 in contact therewith so as to avoid any relative movement of these two components. Since contact printing of the indicia on the film is produced as distinguished from projection printing involving the use of lenses, no complex coordination between different rates of movement of the indicia and the film is required and substantial simplification and savings in parts are achieved. The hub member 22 is initially oriented in the camera so that the apertures 45 are aligned radially with a selected portion of the film 15 trained about the marking unit, for example along the axis 47 shown in FIGURE 1, so that the rotation of the rings 39–44 and shield member 29 responsive to advancement of the film will cause the slots 46 of the shield member 29 to be swept circumferentially past the stationary apertures 45 and expose the film 15 to images of the indicia registering with the slots 46 when the light source 23 is energized.

To assemble and set the marking unit 21 to record the desired data on the film 15, the fiber ring 37 is slipped over the threaded end 33 of the shield member 29 and advanced axially along the latter into abutment with the stop flange 31, the indicia bearing rings 39–44 are fitted over the threaded end 33 in succession and advanced to the positions shown in FIGURES 2 and 3, and the fiber ring 38 and stop ring 35 are similarly applied to the shield member. The retainer nut 36 is then threaded loosely onto the threaded upper end 33 of the shield member 29, the indicia bearing rings 39–44 are rotated to position the desired race number, track name, and date in registry with the associated slots 46 in the cylindrical wall of the shield member, and the retainer nut 36 is then tightened to securely hold the indicia bearing rings 39–44 in their desired relative positions. When it is desired to reset the race number or date or track name, the retainer nut 36 is merely backed off of the associated threads on the shield member 29 sufficient to loosen the ring assembly and the track name, race number and date rings adjusted circumferentially to position the desired data in registry with the slots 46, and the retainer nut 36 tightened to secure the indicia bearing rings in their readjusted positions. Obviously, indicia bearing rings constructed similar to the rings 39–44 but having different data imprinted thereon may be prepared to be substituted for any of the rings 39–44 as desired.

Since it would be undesirable in the particular application described above to photographically record the data on the film 15 for each revolution of the shield member 29, as the recorded data would then appear at successive spaced intervals along the film in the area containing the image of the finish of the race, suitable control means for controlling the light source 23 should be provided. For example, the light source 23 could be normally deenergized, and be energized by closure of a manual switch in its supply circuit just prior to and at the completion of the photographing of the finish of a race, or switch means automatically responsive to starting of the film drive to energize the light source 23 could be provided.

This mechanism also provides an advantageous means of photographically recording timing reference marks or other indicia on the film during photographic recording of the finish of the race. For example, a ring or a plurality of rings similar to the indicia bearing rings 39–44, but having a line or other suitable reference mark thereon aligned with an appropriate slot or slots 46 in the shield member 29 may be substituted for any of the rings 39–44 or added to the assembly to photographically impress timing marks on the film 15 at longitudinally spaced points determined by the circumference of the indicia bearing rings. If the speed of travel of the film is known, the time lapse between the crossings of the finish line by the contestants can be readily calculated from these time reference marks.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In a camera of the continuous flow, strip film type for photographically recording the order in which contestants cross the finish line of a race course having film finishing means for continuously moving a film along a path of travel through the camera, an exposure slit adjacent the path of film travel for covering a narrow field of view containing the finish line of the race course, and lens means for forming an image of the field of view through said slit onto the film; indicia recording means for producing a photographic record of selected indicia on the film during advancement thereof through the camera comprising a stationary hub member removably mounted in the camera adjacent the path of film travel and having an axially elongated cylindrical periphery disposed along an axis arranged transversely of the film and parallel to the adjacent film portion and to the exposure slit, a light source disposed within said hub member extending generally along said axis, means for controlling illumination of the light source, a hollow, rotatable shield member having a cylindrical sleeve portion extending in covering relation about the periphery of said hub member, a plurality of axially spaced annular indicia bearing rings of substantially transparent material removably supported in side-by-side coaxial relation on said cylindrical sleeve portion for axial and angular movement on said shield member providing a cylindrical outer surface to bear against the film over a substantial arcuate zone defining an indicia printing station, said rings having opaque indicia on the outer surface thereof, adjustable means for restraining said rings against angular and axial displacement from their adjusted positions relative to each other and to said shield member, means urging said film in frictional driving contact with the outer surfaces of said indicia bearing rings to rotate said rings and shield member as a unit responsive to advancement of the film and in accordance with the rate of movement thereof, said hub member and shield member each having light apertures aligned with each of said indicia bearing rings to be disposed in radial alignment with each other and with indicia on said rings located at said indicia printing station to produce a contact image of said indicia on said film when said light source is illuminated.

2. In a camera of the continuous flow, strip film type for photographically recording the order in which contestants cross the finish line of a race course having film finishing means for continuously moving a film along a path of travel through the camera, an exposure slit adjacent the path of film travel for covering a narrow field of view containing the finish line of the race course, and lens means for forming an image of the field of view through said slit onto the film; indicia recording means for producing a photographic record of selected indicia on the film during advancement thereof through the camera comprising a stationary hub member removably mounted in the camera adjacent the path of film travel and having an axially elongated cylindrical periphery disposed along an axis arranged transversely of the film and parallel to the adjacent film portion and to the exposure slit, a light source disposed within said hub member extending generally along said axis, means for controlling illumination of the light source, a hollow, rotatable shield member having a cylindrical sleeve portion extending in covering relation about the periphery of said hub member, a plurality of axially spaced annular indicia bearing rings of substantially transparent material removably supported in side-by-side coaxial relation on said cylindrical sleeve portion for axial and angular movement on said shield member providing a cylindrical outer surface to bear against the film over a substantial arcuate zone defining an indicia printing station, said rings having opaque indicia on the outer surface thereof designating the racing establishment, race number, and date, a pair of radially outwardly projecting annular stop members at the opposite ends of said sleeve portion for constraining said rings therebetween, one of said stop members being threadedly coupled to said shield member for clamping said rings between said stop members against angular and axial displacement from their adjusted positions relative to each other and to said shield member, means urging said film in frictional driving contact with the outer surfaces of said indicia bearing rings to rotate said rings and shield member as a unit responsive to advancement of the film and in accordance with the rate of movement thereof, said hub member and shield member each having light apertures aligned with each of said indicia bearing rings to be disposed in radial alignment with each other and with indicia on said rings located at said indicia printing station to produce a contact image of said indicia on said film when said light source is illuminated.

3. In a camera of the continuous flow, strip film type for photographically recording the order in which contestants cross the finish line of a race course having film finishing means for continuously moving a film along a path of travel through the camera, an exposure slit adjacent the path of film travel for covering a narrow field of view containing the finish line of the race course, and lens means for forming an image of the field of view through said slit onto the film; indicia recording means for producing a photographic record of selected indicia on the film during advancement thereof through the camera comprising a stationary hub member removably mounted in the camera adjacent the path of film travel and having an axially elongated cylindrical periphery disposed along an axis arranged transversely of the film and parallel to the adjacent film portion and to the exposure slit, a light source disposed within said hub member extending generally along said axis, means for controlling illumination of the light source, a hollow, rotatable shield member having a cylindrical sleeve portion extending in covering relation about the periphery of said hub member, a plurality of axially spaced annular indicia bearing rings of substantially transparent material removably supported in side-by-side coaxial relation on said cylindrical sleeve portion for axial and angular movement on said shield member providing a cylindrical outer surface to bear against the film over a substantial arcuate zone defining an indicia printing station, said rings having opaque indicia on the outer surface thereof designating the racing establishment, race number, and date, a pair of radially outwardly projecting annular stop members at the opposite ends of said sleeve portion for constraining said rings therebetween, one of said stop members being threadedly coupled to said shield member for clamping said rings between said stop members against angular and axial displacement from their adjusted positions relative to each other and to said shield member, said threadedly coupled stop member being wholly removable from said shield member to permit axial removal and assembly of said rings relative to said shield member, means urging said film in frictional driving contact with the outer surfaces of said indicia bearing rings to rotate said rings and shield member as a unit responsive to advancement of the film and in accordance with the rate of movement thereof, said hub member and shield member each having light apertures aligned with each of said indicia bearing rings to be disposed in radial alignment with each other and with indicia on said rings located at said indicia printing station to produce a contact image of said indicia on said film when said light source is illuminated.

4. Indicia recording apparatus for a race photofinish camera of the continuous flow, strip film type for producing a photographic record of selected indicia on continuously moving strip film during advancement thereof through the camera comprising an elongated, cylindrical hub member adapted to be removably mounted in stationary relation in the camera adjacent the path of film travel and be disposed along an axis arranged transversely of the film and parallel to the adjacent film portion, said hub member having a bore for reception of the light source and an axially spaced series of apertures for passage of light therethrough, a rotatable assembly surrounding said hub member including a hollow shield member of substantially cylindrical configuration rotatably supported in covering relation to the periphery of said hub member and having a series of circumferentially spaced elongated slots aligned transversely of said axis with said apertures to be swept past said apertures upon rotation of the shield member, a series of axially spaced annular indicia bearing rings of substantially transparent material removably supported in side-by-side coaxial relation on said shield member in alignment with said apertures and slots for axial and angular movement on said shield member providing a cylindrical outer surface to bear against the film over a substantial arcuate zone defining an indicia exposure station, said rings having opaque indicia on the outer surface thereof to be photographically recorded on the film including indicia designating race track names, race numbers and dates, adjustable means for restraining said rings against angular and axial displacement from selected adjusted positions relative to each other and to said shield member, said rotatable assembly being adapted to be disposed with the peripheries of said rings in driven contact with the film and said indicia exposure station to effect rotation of said rings and shield member as a unit responsive to advancement of the film and in accordance with the rate of movement thereof, selected indicia on said rings being adjustably disposed in registry with the slots in said shield member to produce a contact image of said indicia on said film at said indicia exposure station when said light source is illuminated and said selected indicia, slots and apertures are in substantial radial alignment.

5. Indicia recording apparatus for a race photofinish camera of the continuous flow, strip film type for producing a photographic record of selected indicia on continuously moving strip film during advancement thereof through the camera comprising an elongated, cylindrical hub member adapted to be removably mounted in stationary relation in the camera adjacent the path of film travel and be disposed along an axis arranged transversely of the film and parallel to the adjacent film portion, said hub member having a bore for reception of the light source and an axially spaced series of apertures for passage of light therethrough, a rotatable assembly surrounding said hub member including a hollow shield member of substantially cylindrical configuration rotatably supported in covering relation to the periphery of said hub member and having a series of circumferentially spaced elongated slots aligned transversely of said axis with said apertures to be swept past said apertures upon rotation of the shield member, a series of axially spaced annular indicia bearing rings of substantially transparent material removably supported in side-by-side coaxial relation on said shield member in alignment with said apertures and slots for axial and angular movement on said shield member providing a cylindrical outer surface to bear against the film over a substantial arcuate zone defining an indicia exposure station, said rings having opaque indicia on the outer surface thereof to be photographically recorded on the film including indicia designating race track names, race numbers and dates, some of said rings having circumferentially spaced indicia thereon designating different information, a pair of radially outwardly projecting annular stop members at the opposite ends of said sleeve portion for constraining said rings therebetween, one of said stop members being threadedly coupled to said shield member for clamping said rings between said stop members against angular and axial displacement from selected adjusted positions relative to each other and to said shield member, said rotatable assembly being adapted to be disposed with the peripheries of said rings in driven contact with the film and said indicia exposure station to effect rotation of said rings and shield member as a unit responsive to advancement of the film and in accordance with the rate of movement thereof, selected indicia on said rings being adjustably disposed in registry with the slots in said shield member to produce a contact image of said indicia on said film at said indicia exposure station when said light source is illuminated and said selected indicia, slots and apertures are in substantial radial alignment.

6. Indicia recording apparatus for a race photofinish camera of the continuous flow, strip film type for producing a photographic record of selected indicia on continuously moving strip film during advancement thereof through the camera comprising an elongated, cylindrical hub member adapted to be removably mounted in stationary relation in the camera adjacent the path of film travel and be disposed along an axis arranged transversely of the film and parallel to the adjacent film portion, said hub member having a bore for reception of the light source and an axially spaced series of apertures for passage of light therethrough, a rotatable assembly surrounding said hub member including a hollow shield member of substantially cylindrical configuration rotatably supported in covering relation to the periphery of said hub member and having a series of circumferentially spaced elongated slots aligned transversely of said axis with said apertures to be swept past said apertures upon rotation of the shield member, a series of axially spaced annular indicia bearing rings of substantially transparent material removably supported in side-by-side coaxial relation on said shield member in alignment with said apertures and slots for axial and angular movement on said shield member providing a cylindrical outer surface to bear against the film over a substantial arcuate zone defining an indicia exposure station, said rings having opaque indicia on the outer surface thereof to be photographically recorded on the film including indicia designating race track names, race numbers and dates, some of said rings having circumferentially spaced indicia thereon designating different information, a pair of radially outwardly projecting annular stop members at the opposite ends of said sleeve portion for constraining said rings therebetween, one of said stop members being threadedly coupled to said shield member for clamping said rings between said stop members against angular and axial displacement from selected adjusted positions relative to each other and to said shield member, said threadedly coupled stop member being wholly removable from said shield member to permit axial removal and assembly of said rings relative to said shield member, said rotatable assembly being adapted to be disposed with the peripheries of said rings in driven contact with the film and said indicia exposure station to effect rotation of said rings and shield member as a unit responsive to advancement of the film in accordance with the rate of movement thereof, selected indicia on said rings being adjustably disposed in registry with the slots in said shield member to produce a contact image of said indicia on said film at said indicia exposure station when said light source is illuminated and said selected indicia, slots and apertures are in substantial radial alignment.

No references cited.

UNITED STATES PATENT OFFICE
CERTIFICATE OF CORRECTION

Patent No. 3,082,424                  March 19, 1963

Glenn D. Laird

It is hereby certified that error appears in the above numbered patent requiring correction and that the said Letters Patent should read as corrected below.

Column 2, line 19, for "rapid" read -- racing --; line 21, for "displaced" read -- displayed --; column 5, line 37, and column 6, lines 4 and 51, for "finishing" read -- feeding --.

Signed and sealed this 11th day of February 1964.

(SEAL)
Attest:

ERNEST W. SWIDER
Attesting Officer

EDWIN L. REYNOLDS

Acting Commissioner of Patents